A. ELMENDORF.
METHOD OF MOLDING PANELS.
APPLICATION FILED JUNE 5, 1920.

1,434,651.

Patented Nov. 7, 1922.

Witness:

Inventor:
Armin Elmendorf
by Chamberlin Freudenreich
Attys

A. ELMENDORF.
METHOD OF MOLDING PANELS.
APPLICATION FILED JUNE 5, 1920.

1,434,651.

Patented Nov. 7, 1922.
2 SHEETS—SHEET 2.

Witness:
Stephen T. Rebma

Inventor:
Armin Elmendorf
by Chamberlin Brendenreich
Attys.

Patented Nov. 7, 1922.

1,434,651

UNITED STATES PATENT OFFICE.

ARMIN ELMENDORF, OF MADISON, WISCONSIN, ASSIGNOR TO HASKELITE MANUFACTURING CORPORATION, A CORPORATION OF NEW YORK.

METHOD OF MOLDING PANELS.

Application filed June 5, 1920. Serial No. 386,887.

*To all whom it may concern:*

Be it known that I, ARMIN ELMENDORF, a citizen of the United States, residing at Madison, county of Dane, State of Wisconsin, have invented a certain new and useful Improvement in Methods of Molding Panels, and declare the following to be a full, clear, and exact description of the same, such as will enable others skilled in the art to which it pertains to make and use the same, reference being had to the accompanying drawings, which form a part of this specification.

In molding large panels so as to curve them in two intersecting planes at right angles to each other, it is customary to steam them or at least moisten them and then press them individually into shape between heated dies of the proper contour. This method of molding requires a considerable number of presses if large quantities of panels are to be molded and, when various different shapes of molded product are desired, it necessitates the employment of a variety of expensive dies.

The object of the present invention is to create a simple and novel method of molding panels which will greatly increase the capacity of a press or of a machine or apparatus employed in its stead.

A further object of the present invention is to produce a simple and novel die structure for pressing and molding panels, which will permit a die having any desired contour, within limits, to be quickly and easily produced.

The various features of novelty whereby my invention is characterized will hereinafter be pointed out with particularity in the claim; but, for a full understanding of my invention and of its objects and advantages, reference may be had to the following detailed description taken in connection with the accompanying drawings, wherein:

Figure 1:
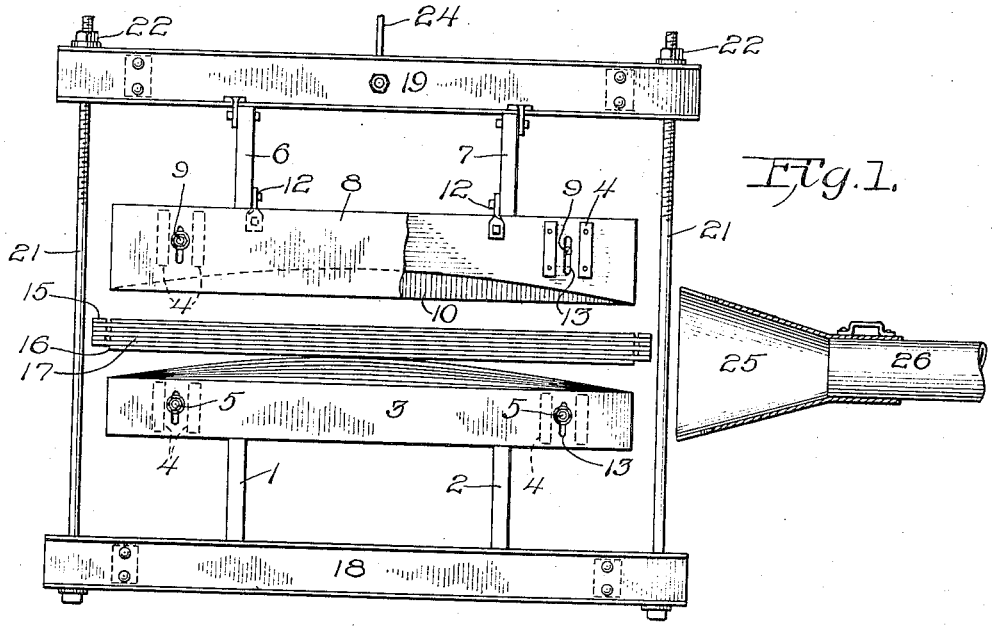
Figure 1 is a side elevation of a molding apparatus arranged in accordance with my invention, containing a stack of panels to be molded, and the dies being spread apart or open.
Figure 2:
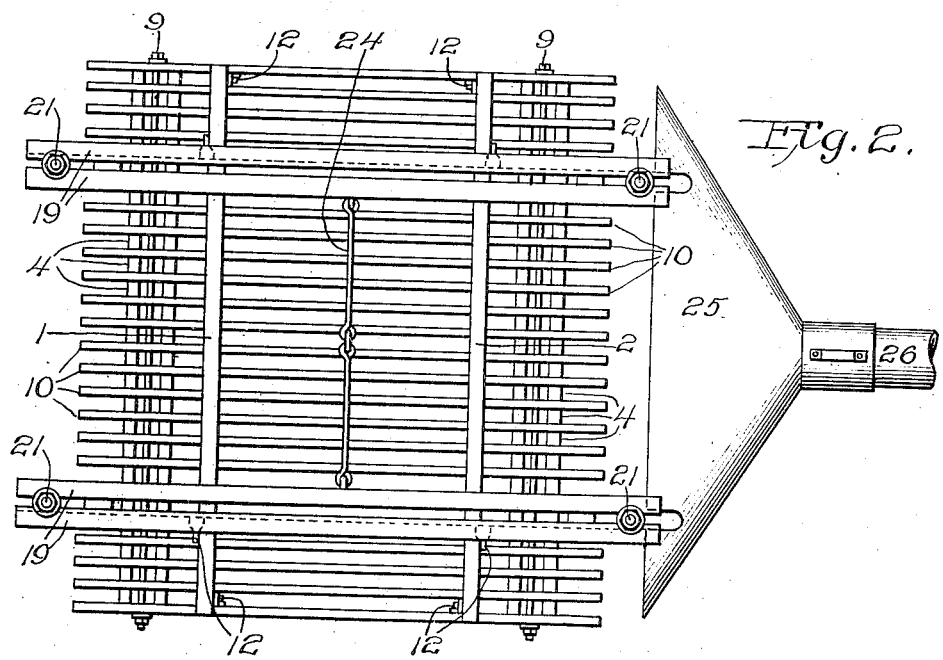
Fig. 2 is a top plan view of the apparatus.

Referring to the drawings, 1 and 2 represent two parallel beams across which are disposed a series of bars, 3. These bars may be made of any suitable material, conveniently of lumber an inch or so thick. These bars are spaced apart by means of suitable blocks, 4; there being enough of the bars and spacing blocks to cover the beams for a distance equal to the length of the panel to be molded, while the length of the bars is determined by the width of the panel to be molded. The upper edges of the bars are so shaped that the combined upper surface of the entire group conforms to the shape of one of the die members by means of which the panels are to be pressed into shape. The group of bars is tied together into a compact unitary structure by means of rods, 5, extending through the same parallel with the beams 1 and 2.

The complementary die member is made of two beams, 6 and 7, similar to the beams 1 and 2 underneath which are placed bars, 8, of the same type as the bars 3 and spaced apart by similar spacing devices, 4; the bars of this group being tied together by means of rods, 9, similar to the rods 5. The lower edges of the bars 8 are shaped in such a way, as indicated at 10, so as to form a die surface complementary to the die surface formed by the curved upper edges, 11, of the bars 3.

The upper die member is fastened to the supporting beams by any suitable fastening means, 12, preferably of a quickly detachable nature, so that it may be raised and lowered by means of these beams.

By making each die out of a larger number of pieces, a die of any desired configuration can readily be built up out of a supply of pieces of various shapes. Furthermore, the curvature of the die surfaces in planes extending longitudinally thereof may be determined in part by the shape of the edges of the beams against which the dies rest. These beams may be either straight or curved. In the arrangement shown, the upper edges of the lower beams 1 and 2 are curved while the lower edges of the upper beams, 6 and 7, are straight; these particular forms being illustrated simply by way of example. It will be seen that by curving the edges of the supporting beams, the height which the working face of any one of the cross bars bears to a horizontal plane depends on the position that it occupies along the supporting beams and therefore, by providing a number of differently shaped supporting beams, a wider range of die contours can be obtained with the same number of cross bars than would be the case if the supporting edges of the beams were straight. The same effect could be obtained as with curved supporting beams by placing blocks or liners of varying thicknesses between some or all of the bars and the supporting beams. In either event, whether it be desired to adjust the bars by placing them in different positions along curved supporting beams or by raising or lowering them relatively to other bars, it is necessary that means be provided for permitting such adjustment without interfering with the clamping rods. This can conveniently be accomplished by providing the cross bars with vertically-elongated slots, 13, through which the tie rods or clamping rods pass, instead of having simply bored round holes sufficiently large to receive the rods.

In using the apparatus, the panels to be molded are first prepared by steaming or boiling them, (this being permitted in the case of ply-wood in which the laminæ are glued together by a waterproof glue, such as blood glue) and a stack of such panels is then laid between the dies and the dies closed upon them.

Figure 3:
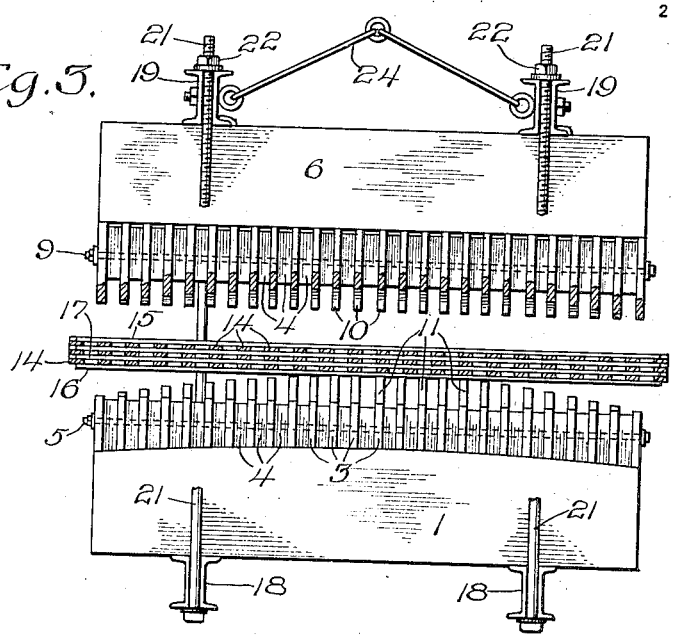
Fig. 3 is a view of the apparatus which is partly an end elevation and partly a section.
Figure 4:
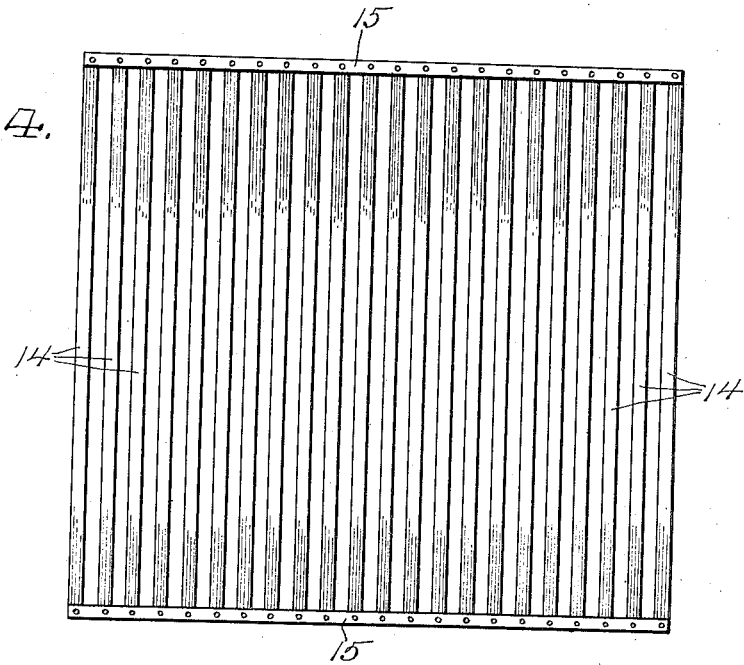
Fig. 4 is a plan view of a mat or grid adapted to be placed between the panels of a stack to be molded.

In order that the panels shall retain the shape into which they are pressed between the dies, it is necessary that they be thoroughly dried, that is that the excess moisture be removed while the panels are still being held in the dies and reduce the moisture contained in the panels to about that which the panels would have in the room or location in which they are to be placed permanently. This drying of the panels may conveniently be brought about by stacking them in such a way that they will be out of contact with each other and then blowing or otherwise passing air, preferably hot air, through the stack until the moisture content has been reduced to a stable condition. To this end I provide a series of open-work mats such as shown in detail in Fig. 4. Each of these mats is made up of a large number of thin flat strips, 14, preferably of wood, having a thickness in the neighborhood of a quarter of an inch, spaced apart in parallel relation to each other. Across the ends of the strips are fastened binding pieces, 15, which are spaced apart a distance greater than the width of the panels. In assembling the stack of panels, on the first panel, 16, as indicated in Figs. 1 and 3, is placed a mat in such position that the strips extend across the panel with the tie pieces, 15, lying somewhat beyond the side edges of the panel. On top of the mat is placed a second panel, 17, and then a mat and then another panel, and so on, until a stack is produced which contains the desired number of panels. In practice I have found it convenient to mold as many as ten panels at a time, although the number will vary greatly according to the conditions which are to be met.

After the stack of panels has been assembled between the dies, the dies must be pressed together with great force. This may be accomplished by placing the filled dies in a press of any suitable kind. In the arrangement shown, the beams or sills, 1 and 2, rest upon strong metal beams, 18, while the beams or sills, 6 and 7, are hung from other heavy beams, 19, extending across the same. Each of the beams, 18, is connected to the corresponding beam, 19, by means of a heavy rod, 21, screw threaded at at least one end and having on the screw threaded portion a nut, 22. After the parts have been assembled as heretofore explained, the nuts, 22, are tightened until the dies are completely closed.

The upper half of the machine may be raised and lowered in any suitable way. In the arrangement shown, there is a bail, 24, extending between the upper beams, 19, to which bail a suitable lifting device may be attached so as to raise the upper half of the die when the nuts, 22, are unscrewed.

After the dies have been closed on the stack of panels as heretofore explained, a funnel, 25, having a length equal to the length of the panels and a height equal to the maximum height along the side of the stack, may be placed against the side of the machine, heated air being delivered to this funnel through a suitable supply conduit, 26. The air from the funnel passes between the strips of each mat in contact with the adjacent surfaces of the two panels which are held spaced apart from each other by the mats, and finally passes out of the stack on the opposite side from that at which it entered.

I claim:

The process of molding wood panels which consists in forming a stack of dampened panels in which the panels alternate with bendable spacers forming numerous passages extending through the stack between consecutive panels, pressing the stack between complementary concave and convex dies, and blowing heated air through said air passages.

In testimony whereof, I sign this specification.

ARMIN ELMENDORF.